United States Patent
Raghunath et al.

(10) Patent No.: US 11,550,617 B2
(45) Date of Patent: Jan. 10, 2023

(54) DISAGGREGATED RACK MOUNT STORAGE SIDE TRANSACTION SUPPORT

(71) Applicant: Intel Corporation, Santa Clara, CA (US)

(72) Inventors: Arun Raghunath, Portland, OR (US); Yi Zou, Portland, OR (US); Tushar Sudhakar Gohad, Phoenix, AZ (US); Anjaneya R. Chagam Reddy, Chandler, AZ (US); Sujoy Sen, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 16/907,927

(22) Filed: Jun. 22, 2020

(65) Prior Publication Data

US 2020/0319915 A1    Oct. 8, 2020

Related U.S. Application Data

(60) Provisional application No. 62/916,176, filed on Oct. 16, 2019.

(51) Int. Cl.
  *G06F 9/46*    (2006.01)
  *G06F 3/06*    (2006.01)

(52) U.S. Cl.
  CPC .......... *G06F 9/467* (2013.01); *G06F 3/0604* (2013.01); *G06F 3/0655* (2013.01); *G06F 3/0676* (2013.01); *G06F 3/0679* (2013.01)

(58) Field of Classification Search
  CPC ...... G06F 3/467; G06F 3/0604; G06F 3/0655; G06F 3/0676; G06F 3/0679; G06F 9/466–467
  See application file for complete search history.

(56) References Cited

U.S. PATENT DOCUMENTS

| | | | |
|---|---|---|---|
| 2010/0017572 A1* | 1/2010 | Koka .................. | G06F 12/0815 711/E12.001 |
| 2014/0040898 A1* | 2/2014 | Karp ...................... | G06F 9/466 718/101 |
| 2014/0068201 A1* | 3/2014 | Fromm ............... | G06F 12/0831 711/148 |

(Continued)

OTHER PUBLICATIONS

Starting on p. 1, figures 1a, 1b, 2, and 3 only of the non-published U.S. Appl. No. 16/907,927, filed Jun. 22, 2020, pp. 1-4.

(Continued)

*Primary Examiner* — Ryan Bertram
(74) *Attorney, Agent, or Firm* — Compass IP Law PC (57) ABSTRACT

A method is described. The method includes performing the following with a storage end transaction agent within a storage sled of a rack mounted computing system: receiving a request to perform storage operations with one or more storage devices of the storage sled, the request specifying an all-or-nothing semantic for the storage operations; recognizing that all of the storage operations have successfully completed; after all of the storage operations have successfully completed, reporting to a CPU side transaction agent that sent the request that all of the storage operations have successfully completed.

17 Claims, 7 Drawing Sheets

(56) References Cited

U.S. PATENT DOCUMENTS

| | | | |
|---|---|---|---|
| 2015/0269116 A1* | 9/2015 | Raikin | B01J 35/04 |
| | | | 709/212 |
| 2018/0173673 A1* | 6/2018 | Daglis | G06F 9/467 |
| 2018/0329650 A1* | 11/2018 | Guim Bernat | G06F 3/067 |
| 2019/0042090 A1 | 2/2019 | Raghunath et al. | |
| 2019/0042091 A1 | 2/2019 | Raghunath et al. | |
| 2019/0332529 A1* | 10/2019 | Byrne | G06F 12/0806 |
| 2020/0081712 A1* | 3/2020 | Lackey, Jr. | G06F 9/5072 |
| 2020/0242042 A1* | 7/2020 | Svennebring | G06F 9/3004 |
| 2020/0341820 A1* | 10/2020 | Fang | G06F 12/0842 |
| 2022/0066869 A1* | 3/2022 | Hornung | G06F 11/106 |

OTHER PUBLICATIONS

Starting on p. 4, paragraphs [0011] through paragraph [0025] only of the non-published U.S. Appl. No. 16/907,927, filed Jun. 22, 2020, pp. 4-9.

\* cited by examiner

DISAGGREGATED RACK MOUNT STORAGE SIDE TRANSACTION SUPPORT

RELATED CASES

This application claims the benefit of U.S. Provisional Application No. 62/916,176, entitled, "DISAGGREGATED RACK MOUNT STORAGE SIDE TRANSACTION SUPPORT", filed Oct. 16, 2019, which is incorporated by reference in its entirety.

FIELD OF INVENTION

The field of invention pertains generally to the computing sciences, and, more specifically, to disaggregated rack mount storage side transaction support.

BACKGROUND

With the emergence of cloud computing, big data, artificial intelligence and other high performance computing needs, the technology of the data center is receiving significant attention and re-invention. With the re-invention, however, new challenges are presented that should be overcome to make better use of the data center's computing and/or storage resources.

FIGURES

A better understanding of the present invention can be obtained from the following detailed description in conjunction with the following drawings, in which.

DETAILED DESCRIPTION

Figure 1A:
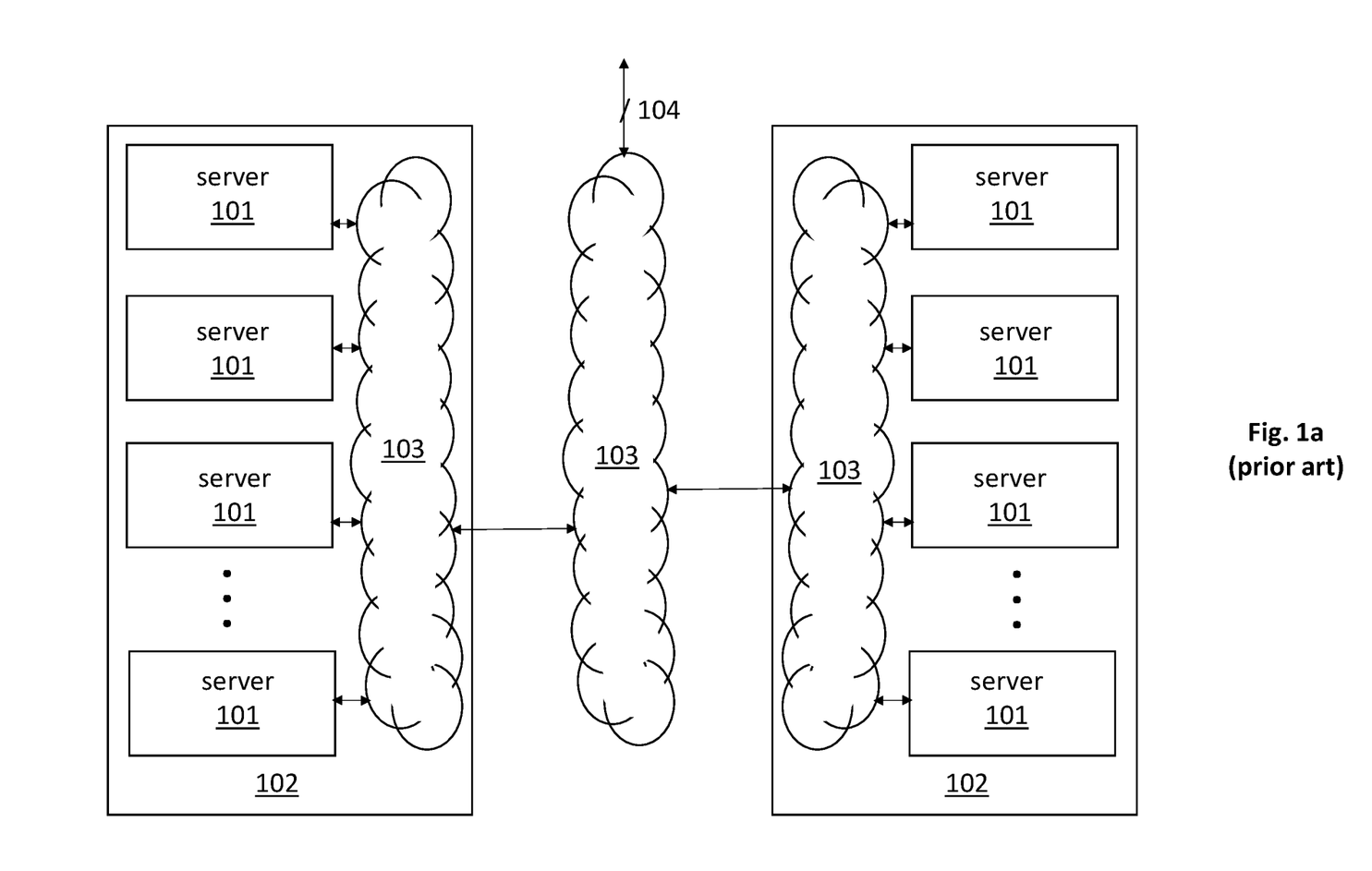
FIG. 1a shows a traditional rack mount approach (prior art)
Figure 1B:
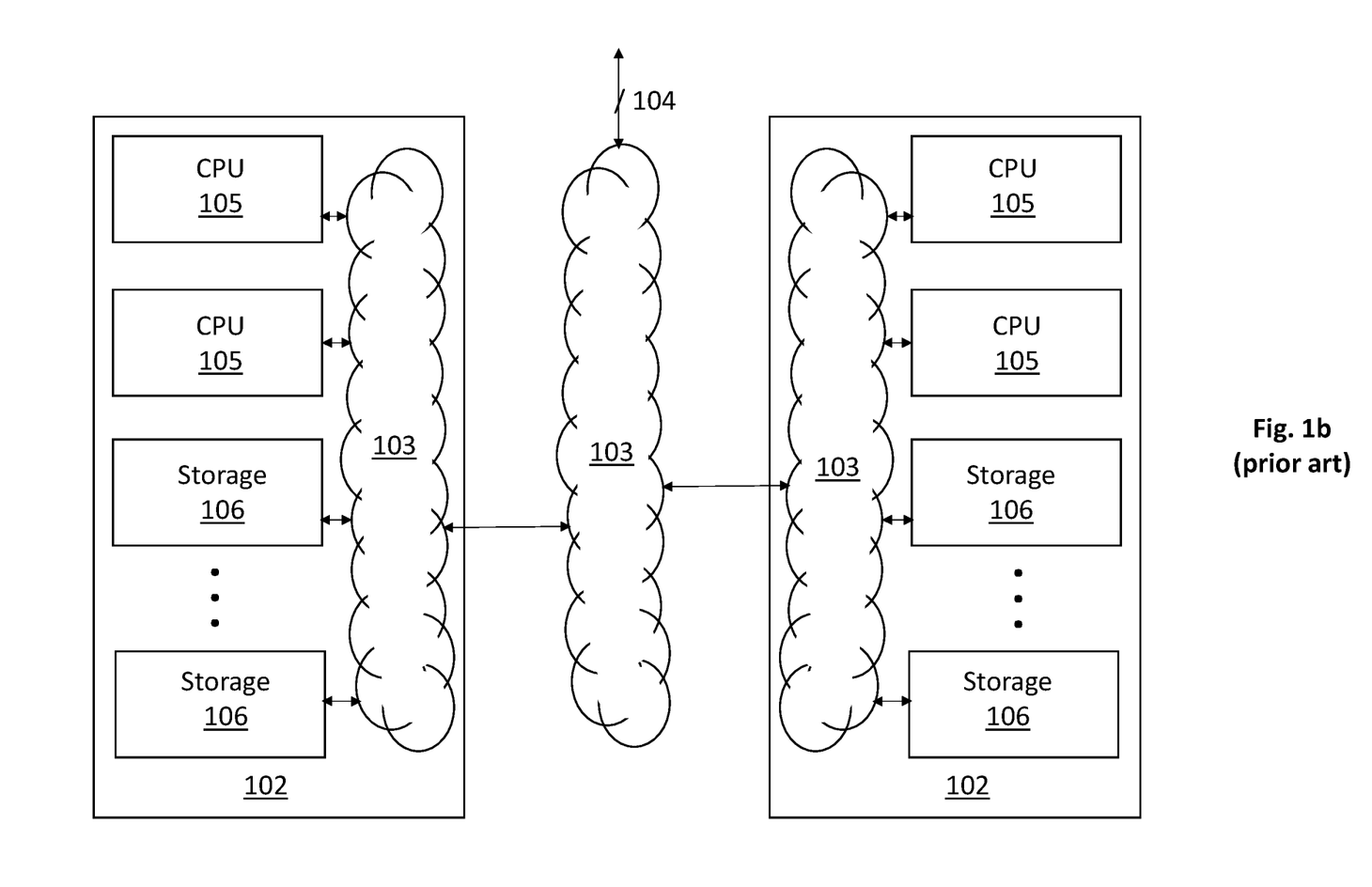
FIG. 1b shows an emerging rack mount approach (prior art)

FIGS. 1a and 1b depict the evolution of rack mounted computer systems as, e.g., commonly implemented in large entity data centers. Traditionally, as depicted in FIG. 1a, a rack mount implementation consists of discrete server computers 101 that are each individually mounted in one or more racks 102 (for ease of drawing only two racks are depicted, large scale data centers often contain more than two racks). Here, each server 101 is viewed as a high performance computer having considerable central processing unit (CPU) performance, memory capacity and non volatile mass storage capacity. The application software executed by the data center is essentially distributed across the rack mounted servers 101. A network 103 communicatively couples the servers 101 within racks and between racks. The network 103 also has one or more gateways 104 to a larger network such as the Internet.

As observed in FIG. 1b, however, rack mount computing has begun to evolve into more piecemeal construction of overall computing system(s) within the rack(s) of the data center. Here, the basic components of a computer, most notably the CPU and data storage are broken out into separate, rack mountable sleds. That is, for instance, within a single rack (and/or across multiple racks) one or more CPU sleds 105 are mounted to the rack(s) 100 and one or more non volatile mass storage sleds 106 (hereinafter, storage sleds) are mounted to the rack(s) 100. The CPU sleds 105 emphasize processing power and therefore contain multiple processor chips (CPUs) and associated memory with less emphasis on data storage. By contrast, the storage sleds 106 emphasize non volatile data storage and therefore largely contain non-volatile storage devices (e.g., solid state drives (SSDs) and/or hard disk drives (HDDs)) with less emphasis on CPU processing power.

Here, the fractionalization of a computing system into separate processing and storage sleds allows for better computing system component utilization and/or customized computing configuration in view of need. That is, computing power and storage can be balanced as needed with, e.g., uses that demand more processing power being realized with more CPU sleds and uses that demand more storage being realized with more storage sleds, etc. Future evolution of rack mounted computing system fractionalization (also referred to as "disaggregation") envisions separate system memory sleds so that a mix of CPU sleds can be custom fit into rack(s) with appropriate number(s) of memory sleds and storage sleds to effect an overall computing system that is tuned to its particular use.

Figure 2:
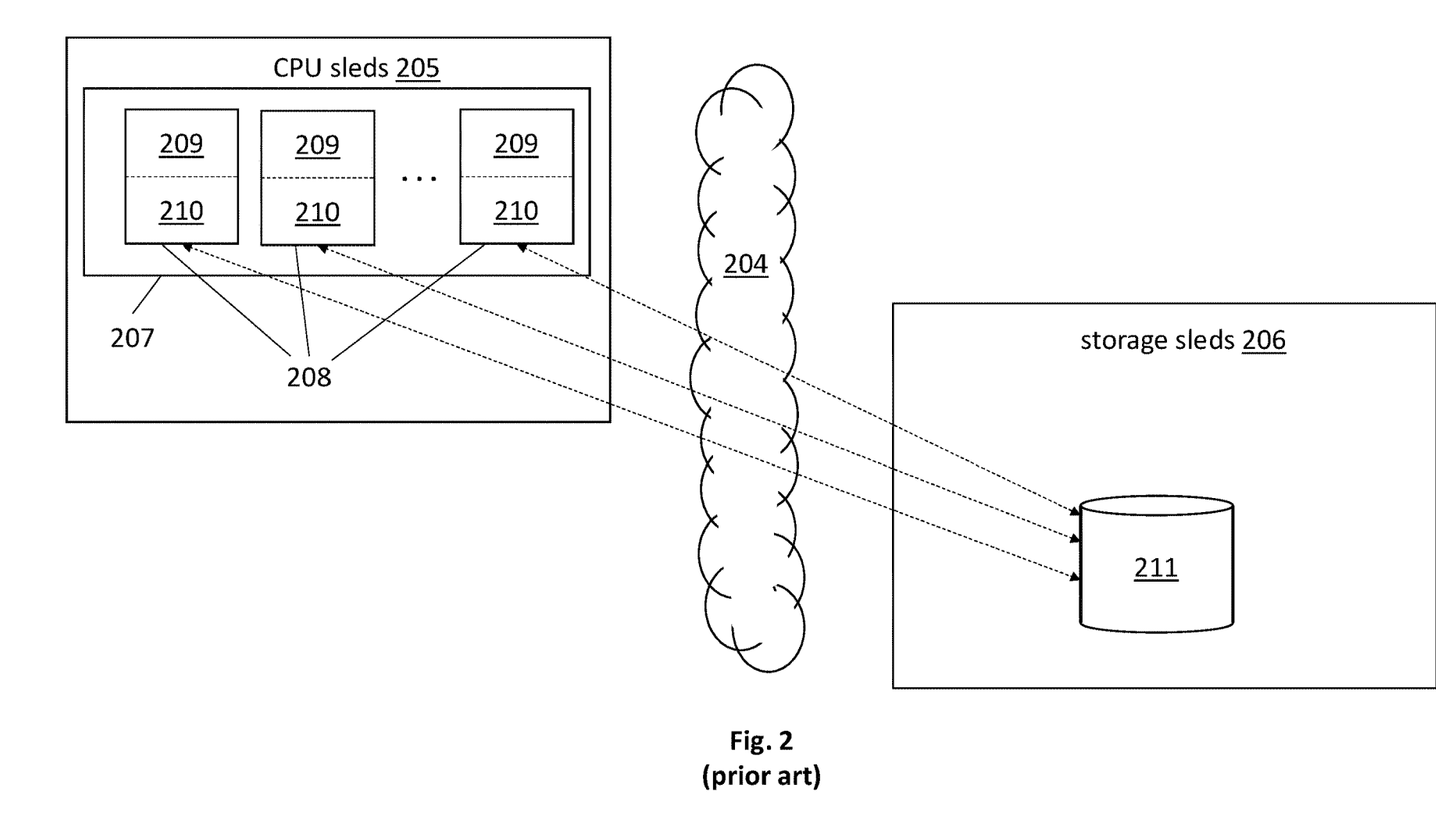
FIG. 2 shows a traditional SDS application executing on the emerging rack mount approach (prior art)

Challenges can arise, however, when application software originally designed to execute on a traditional rack mount system of FIG. 1a is instantiated on a disaggregated rack mount system of FIG. 1b. FIG. 2 shows one such scenario where a traditional software-defined-storage (SDS) application 207 is executing on one or more CPU sleds 205 of a disaggregated rack mount system. As can be seen, the entire SDS application 207 executes on the one or more CPU sled(s) 205 and views the storage sleds 206 as low level or "raw" physical storage media 211 with little/no supporting functionality other than PUT and GET operations.

Unfortunately, owing to the architecture and executional semantics of an SDS application, inefficiencies in the form of excessive traffic over the network 204 can result. Here, network 204 can correspond to any network used to couple host resources to storage resources such as Non-Volatile Memory Express (NVMe) or Non-Volatile Memory Express-Over Fabric (NVMe-oF, e.g., as described in the NVM Express™ Base Specification, Revision 1.4 (2019), and/or predecessors, successors, etc.). Notably, network 204 can span between two or more different rack mounted systems (e.g., a first rack that is populated with CPU sleds 205 and one or more different racks that are populated with storage sleds 206).

With respect to the aforementioned inefficiency, as observed in FIG. 2, a typical SDS application is implemented as a number of "instances" 208 each having a layered stack of higher level control functions 209 atop lower level data access/management functions 210. The higher level control functions 209 can include any of: 1) management of client application programming interfaces (APIs); 2) mapping/resolution of data item identifier (e.g., object ID or directory path) to physical storage location; 3) replication management (e.g., overseeing storage of multiple copies of a data item into multiple storage locations to guarantee reliability of the data storage system) among other possible functions.

The lower level data access/management functions 210 manage/oversee the physical storage media 211. Such functions include any of: 1) block allocation (assigning free blocks to incoming write data that does not overwrite existing data); 2) free block tracking (tracking which blocks are free to be allocated); 3) tracking superblock definition (identifying which blocks are combined to form a larger super block); and, 4) execution of error correction and recovery protocols (e.g., calculation and storage of parity data during a write, incorporation of parity data to recover lost data during a read, etc.) among possible other functions.

Integrating both the upper control 209 and lower data access/management 210 stack levels (or "layers") into a single instance 208 can create excessively large demands on the network. Here, as observed in FIG. 2, multiple SDS instances 208 can be distributed across multiple CPU sleds 205. Importantly, traditional SDS applications that were designed for implementation in racks of discrete servers, as described above with respect to FIG. 1a, expected tight physical coupling between an SDS instance and the storage media it utilized. That is, an SDS instance executing within a particular server was assumed/expected to use the storage media within the same server.

However, when SDS instances are executing on CPU sleds 205 and rely upon the storage resources of separate storage sleds 206, excessive traffic can be presented on the network 204 that couples the CPU sleds 205 and storage sleds 206 together. A first source of excessive traffic is the low level exchange of meta data information and data between the actual storage devices 211 (e.g., the SSDs and/or HDDs) and the low level data access/management functions 210. That is, in order for a low level data access/management function 210 that is separated from its physical storage resource by a network to perform block allocation and/or free block tracking, for example, the SSDs and/or HDDs 211 of the storage sled(s) 206 that are coupled to the low level data access/management function 210 must regularly transmit the respective status of their respective data blocks over the network 204 to the lower level data function.

Likewise, in order to implement error correction encoding, during a PUT operation, the parity information is calculated by the lower level data access/management function 210 at the processing sled 205 and then transmitted over the network 204 to the storage sled. Similarly, during a GET operation, the parity information read from the storage media 211 by the storage sled(s) 206 must be transported over the network 204 to the CPU sled 205 so the lower level data access/management function 210 can perform error detection and correction. As the parity information typically corresponds to a non-negligible amount of data (e.g., 10-20% of the amount of random customer data), the offered load presented to the network 204 is scaled upward in proportion to the amount of parity for each PUT and GET operation.

Another large scale inefficiency can occur in the case of replication. In the case of replication, PUT data is received at a "primary" SDS instance. The SDS instance stores the data and sends multiple copies of the same data to other "secondary" SDS instances which then store the copies as backup versions. In a traditional rack mount approach where the secondary SDS instances use the storage resources within their own respective server, the storage of the copies does not add any increased traffic to the network (it is kept internal within the server).

However, in the emerging disaggregated rack approach of FIG. 2 where the CPU sleds are separated from the storage sleds by a network 103, the storage of the copies by the secondary SDS instances 208 from their respective lower levels 210 over the network 204 to respective storage sleds 206 increases the offered load to the network 204 by a factor equal to the number of copies (each secondary SDS instance sends a copy to its corresponding storage sled).

Figure 3:
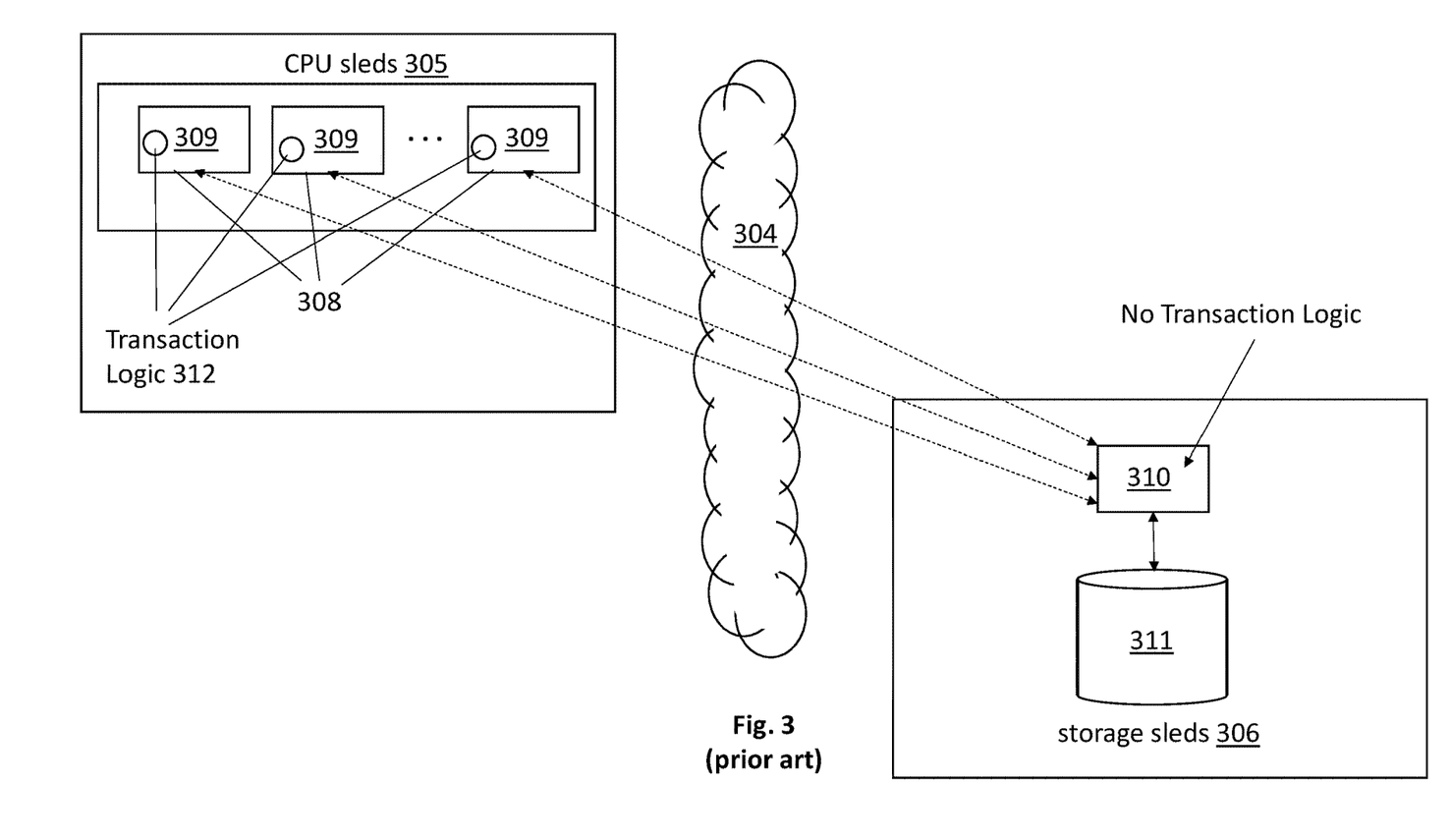
FIG. 3 shows an SDS application being split into control instances that execute on CPU sleds and data instances that execute on storage sleds (prior art)

FIG. 3 therefore shows an improved architecture in which the SDS protocol stack is split such that the upper "control" level 309 continues to execute on the CPU sleds 305 but the lower data access/management level 310 is migrated to the storage sleds 306 (each storage sled would have at least one instance of a lower data access/management level 310). Migration of the data access/management level 310 to the storage sleds 306 eliminates the inefficient transport of low level block level information associated with the actual storage devices 311 being transported over the network. Instead they are kept within the storage sleds 306.

Additionally, the aforementioned replication inefficiency is overcome by sending the original data and all of its replication copies from the primary control instance directly to the storage sled(s) 306 where they will be stored rather than sending copies from the primary control instance to any secondary control instances. So doing reduces the load on the network 304 to that of a traditional rack amount approach (a replica copy is only sent once (and not twice) over the network).

As a point of distinction, in the traditional rack approach, one replica copy is sent over the network from the primary SDS instance to each of the secondary SDS instances. These copies are thereafter stored locally on the storage resources on the same server(s) as the secondary SDS instance(s) and therefore are not presented on the network again. By contrast, in the improved architecture of FIG. 3, no copies are sent to any secondary control instance (which eliminates CPU sled to CPU sled transmissions of copies over the network) and instead the original and all copies are sent directly over the network from the primary control instance to the storage sled(s) 306 where they are to be stored. As such, in both the standard rack approach and the improved rack approach of FIG. 3, each replica copy is sent over the network only once.

Although the architecture of FIG. 3 overcomes a number of inefficiencies that would otherwise exist with a traditional SDS deployment in a disaggregated rack, other inefficiencies can still remain. In particular, any "batch" or "transaction" processing is completely overseen and/or coordinated by the upper control level instances 309. In the case of "batch" or "transaction" processing, a single transaction contains a number of GET and/or PUT operations before the transaction can be deemed completed.

Thus, if a single transaction entails N number of GETs and/or PUTs from/to storage 311, there will be N protocol and/or data exchanges over the network 304 (one for each data item to be PUT/GET to/from storage 311) between the upper control level instances 309 and the lower data access/management level instance(s) 310.

Unfortunately, if the transaction fails for some reason, e.g., in the case of a two-phase commit protocol or similar process being coordinated at the upper control level 309 in which the N PUTs/GETs of the transaction cannot be committed to storage 311 resulting in rollback of the entire transaction, any protocol and/or data exchanges that occurred over the network 304 prior to the failure to commit represented a waste of network resources. Failure of a transaction can result, e.g., from some kind of hard failure with a storage device, or, one of the data blocks that was to be PUT/GET was locked by another competing transaction resulting in the access for the block and/or transaction, e.g., timing out.

Figure 4:
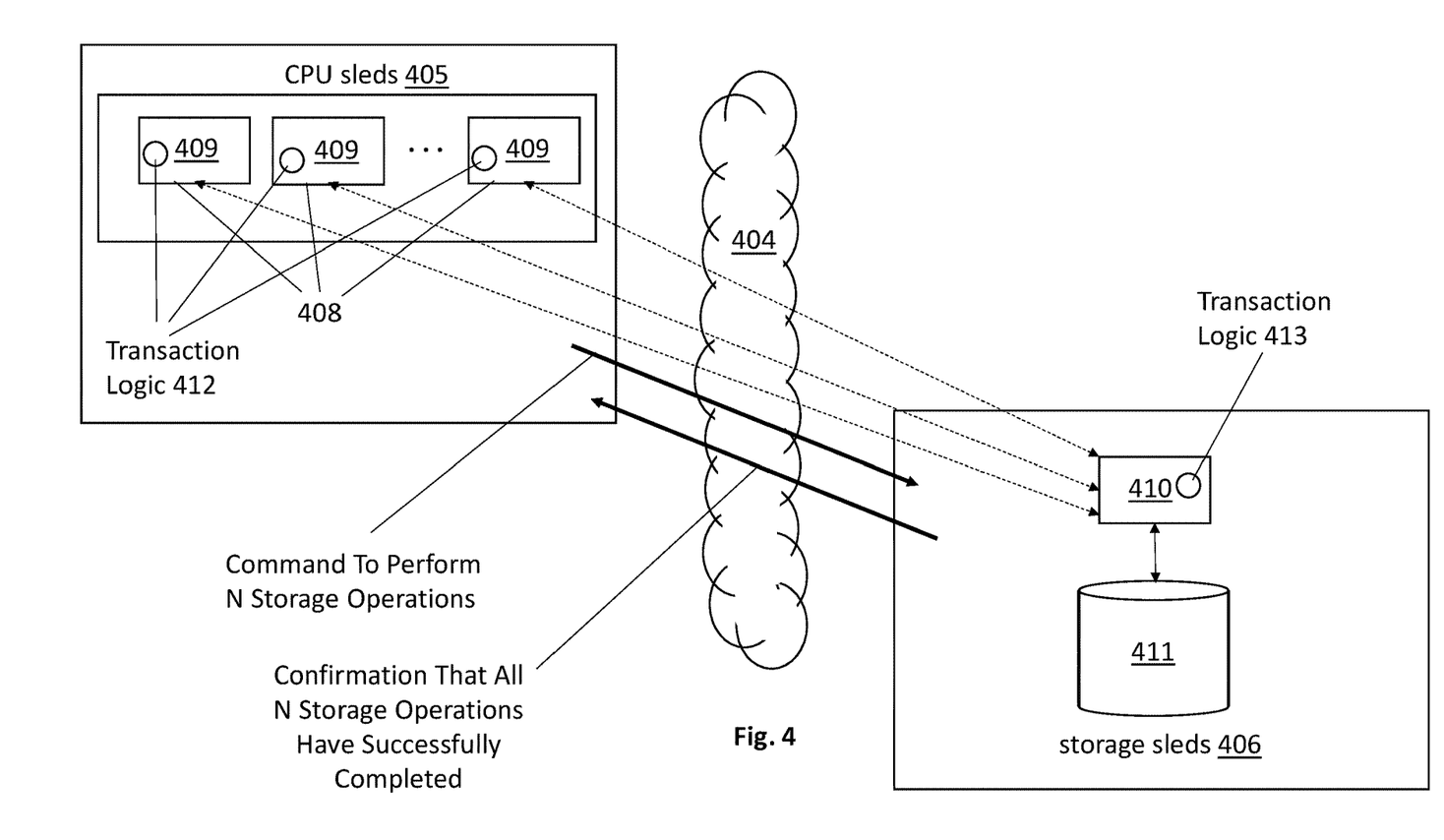
FIG. 4 shows an improved approach that integrates transaction support on the storage sled side.

A solution, as observed in FIG. 4, is to integrate some form of transaction support in the lower data access/management level 410. Here, a control instance (or as described further below, a transaction agent in a CPU sled) sends a command over the network 404 to a data access/management level instance 410 in a storage sled 406 that indicates N operations are to be performed according to an all-or-nothing semantic. For instance, in the case where the N operations are all PUT operations, the command indicates that N PUT operations are to be performed (the addresses are provided or otherwise described in the command and the PUT data is appended or otherwise associated with the command) and that the all-or-nothing semantic is to apply.

The transaction support logic 413 at the storage end ("storage side transaction support logic"), in response, issues N PUT commands to the appropriate storage resources 411. However, as PUT operations are completed at the storage end 406 their individual completion is not transmitted over the network 404 to the particular control level instance 409 that requested the transaction. Rather, only after all N PUT operations have been successfully performed does the transaction support logic 413 at the storage end 406 report completion of all N to the control level instance 409 that requested the transaction. As such, other than the initial command, subsequent protocol exchanges that would normally transpire if full transaction control were executed on the CPU side 405 are not transmitted over the network 404 until the storage side transaction support logic 413 confirms that all N operations have been successfully performed and/or the transaction has been completed (has not failed).

In the case of an all-or-nothing command that contains a mixture of PUTs and GETs, or is composed entirely of GETs, note that the same process as described above occurs except that the confirmation of completion includes or is associated with the requested read data itself (e.g., read data is queued at the storage end 406 until confirmation that all N operations have successfully completed). That is, in an embodiment, the storage end 406 does not send any read data (if any) until all GETs associated with the same all-or-nothing sequence have successfully completed.

The transactional inefficiency of the system of FIG. 3 is essentially avoided in the case of failure of any of the operations. For example, with respect to the improved system of FIG. 4, in the case of a transaction of N GETs, if the last (Nth) GET fails, none of the prior N-1 read data items will have been transmitted over the network 404 (they would instead remain queued at the storage sled 406). By contrast, as explained above with respect to the system of FIG. 3, all N-1 prior GET results (read data) would have been sent by the storage sled 306 to the SDS control instance even though the overall transaction could not complete.

Note that the storage end can queue the write data for any PUT operations and not erase or overwrite the data until the PUT operation's larger transaction has successfully completed. The queuing of a PUT's data remains in place if the PUT's initial transaction request failed to successfully complete. For example, if M PUT operations are part of an all-or-nothing sequence, and the sequence is not able to be fully performed resulting in failure of the initial transaction, the storage end 406 can keep the queued PUT data on the expectation that the transaction will be re-initiated by the control instance that requested it. If so, the control instance need not resend the PUT data to the storage end 406 because it is queued at the storage end since the attempted execution of the prior (failed) transaction. Upon receipt of the second request for the same transaction the storage end 406 simply replays the PUT data from its own internal queue to service the transaction request. In an architecture where there is no transaction support at the storage end, as discussed above with respect to FIG. 3, note that the PUT data would have to be sent again over the network from the control instance to the storage end in order to re-attempt the transaction.

It is worthwhile to reiterate that network 404 can span between two or more different rack mounted systems (e.g., a first rack that is populated with CPU sleds 205 and one or more different racks that are populated with storage sleds 206). In particular, network 404 can be a true network in the sense that its expanse reaches over an extended geographic area (e.g., between multiple racks as opposed to being confined within a single rack or computer system), and/or the network 404 can have multiple nodal hops between endpoints (including, e.g., the execution of a routing layer protocol such as the Internet Protocol (IP) at its nodes to manage nodal routes through the network), and/or a transport layer protocol (e.g., the Transmission Control Protocol (TCP)) can be executed on top of the network 404. One such network is an NVME-of network.

As is understand in the art, NVMe has largely replaced legacy host to storage communication interfaces (such as Serial ATA (SATA)) because NVMe's command and/or data flows take better advantage of the random access nature and associated parallelism that is characteristic of semiconductor non volatile memories (whereas legacy storage interfaces such as SATA were directed to disk drives whose track structure imposed lengthy streams of contiguous data as the basic unit of access).

Traditional NVMe implementations, however, have relied upon direct local attach solutions as the physical interconnect between the host and storage (e.g., Peripheral Component Interconnect Express (PCIe) used as a direct connection between a host and storage within a computer chassis or rack).

NVM-oF, by contrast, is directed to expanding the communication solution that resides between host and storage from local attach to a larger scale network. As such, underlying physical transport mechanisms that are envisioned for use with NVMe-of include those used to implement actual networks (e.g., Ethernet), rather than just local attach. The existence of an NVM-oF network or other true network 404 between the CPU sleds 405 and the storage sleds 406 makes particular sense in the case of distributed transactions, such as the kinds of distributed transactions that could make use of the improvements described just above with respect to FIG. 4, because, with such a network 404, the individual units of storage that are the targets of the transaction can be widely dispersed geographically and/or architecturally (e.g., across the directory hierarchy of a large scale file system).

Figure 5:
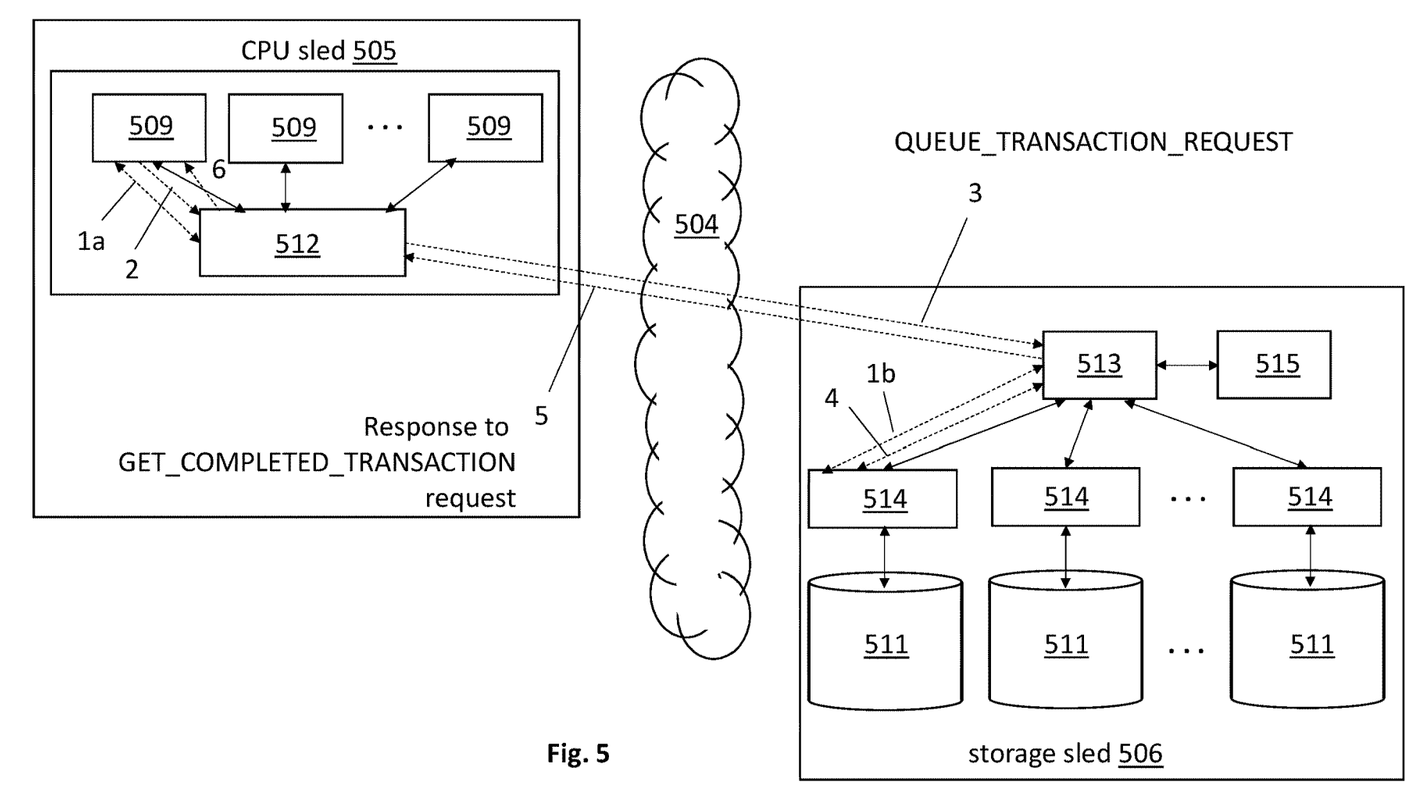
FIG. 5 shows a detailed view of an embodiment of the approach of FIG. 4.

FIG. 5 shows a more detailed view of the transaction supported storage end approach of FIG. 4. As observed in FIG. 5, a plurality of control instances 509 have access to a CPU side transaction agent 512. Before any particular control instance attempts to initiate a multi-operation transaction, it first registers 1a for callback with the CPU side transaction agent 512. Callback registration 1a with the CPU side transaction agent 512, as will be made more clear in the following discussion, permits the control instance to invoke methods of and/or otherwise communicate with the CPU side transaction agent 512 and vice-versa.

In the particular embodiment of FIG. 5, the CPU transaction agent 512 is separate from the control instances 509 so that multiple control instances 509, e.g., that execute on the same processing sled or processor within the sled can invoke/share the same CPU side transaction agent 512. As such, multiple CPU transaction agents can exist per CPU sled depending on configuration. Here, for instance, each control instance 509 and the CPU side transaction agent 512 is allocated or executes on its own respective software process or thread. Registration essentially establishes inter-process/thread communication (e.g., by way of a shared memory communication system) between the CPU side transaction agent 512 and any control instance 509 that has registered with the CPU side transaction agent 512.

Likewise, on the storage end 506, a storage side transaction agent 513 is instantiated that engages in a callback registration process 1b with each of the different mass storage interfaces 514 on a particular storage sled. Here, the different mass storage interfaces 514 may be responsible for their own respective subset of mass storage resources (e.g., set of SSD devices) within a storage sled. For ease of drawing FIG. 5 only depicts a single CPU sled 505 and a single storage sled 506. The reader should understand the architecture of FIG. 5 can be readily expanded to include multiple CPU sleds and multiple storage sleds each communicatively coupled through the network.

The storage side registration 1b allows for inter-process/thread communication between the storage side transaction agent 513 and the mass storage interfaces 514 that register with it. As will be described more fully below, the storage side transaction agent 513 reports the status of a transaction that is being supported by a registered mass storage interface 514 to the control instances 509 that initiated it or to any other interested control instances 509.

After registration, a registered control instance 509 sends a transaction request 2 to the CPU side transaction agent 512. The transaction request, in various embodiments, identifies the list of operations to be performed.

In response to the transaction request 2, the CPU side transaction agent 512 sends 3 a QUEUE_TRANSACTION_REQUEST to the storage side transaction agent 513. In an embodiment, the QUEUE_TRANSACTION_REQUEST includes: 1) a transaction identifier (transaction_ID); 2) a list of CPU side transaction agents other than the requesting CPU side transaction agent 512 that are interested in the particular transaction and may need to know its status (the requesting CPU transaction agent 512 can be assumed to be interested or can be explicitly listed in the list); and, 3) the list of storage operations associated with this particular transaction_ID (e.g., as a serialized blob).

With respect to 2) above, note that in the case of widescale distributed transactions, the initial transaction request 2 sent by a particular control instance 509 may be part of a much larger distributed transaction in which the requesting control instance is just one component. As such, other control instances and/or CPU side transaction agents on the same or other sleds may be part of the larger distributed transaction and therefore may be interested in the progress/status of the particular transaction that is being requested by the requesting CPU side transaction agent 512. Alternatively, other "pending" or "competing" transactions that are waiting for the transaction to complete may monitor the transaction to keep abreast of when they can commence. Further still, another reason that other agents might be interested in a particular transaction is that these agents might be caching certain data (on the CPU sleds on which they execute), which might be updated by the particular transaction. The mechanism of sending an update to an 'interested' agent allows these agents to keep their caches coherent (if the data is modified, they can drop the stale data, or, pull in the newly modified data without requiring a separate coherency protocol).

When the storage side transaction agent 513 receives the QUEUE_TRANSACTION_REQUEST sent by the CPU side transaction agent 512, it updates its transaction state records 515 to include a record for the newly received transaction request. Notably, other transactions that were previously received by the storage side transaction agent 513 have respective records in the transaction state records 515. The entry for the new transaction identifies the transaction by its transaction_ID and lists the identities of the transaction agents that are interested in the transaction (and at least includes the requesting transaction agent).

The formal status of the transaction is also listed which, in an embodiment, identifies whether the transaction has successfully completed or not. Conceivably more fine grained status information can be included such as any of: 1) identifying which of the requested operations have been completed; 2) identifying which of the requested operations have not been completed; 3) identifying the percentage of requested operations that have (or have not) been completed; 4) an estimate of the time to completion of the requested operations, etc.

Importantly, from the perspective of the requesting CPU side transaction agent 512, the requested transaction has been queued at the storage end 506 which permits the requesting CPU side transaction agent 512 to move forward to a next transaction.

Upon a record for the transaction is listed in the transaction state records 515, the storage side transaction agent 513 proceeds to issue the sequence of operations to the applicable mass storage interface(s) 514. If fine grained state tracking is in play, e.g., the state record for the transaction may be updated with each completed one of the operations. Once all the operations have been completed the transaction state record 515 is updated to reflect that the transaction is deemed complete at the storage end 506.

In further embodiments, the CPU side requesting transaction agent 512 periodically sends a GET_COMPLETED_TRANSACTION request (not shown) to the storage side transaction agent 513. The request identifies the requesting CPU side transaction agent 512 and the last transaction it received notification of completion of. In response to the request, the storage side transaction agent 513 refers to its transaction state records 515 and identifies all transactions that the requesting CPU side transaction agent 512 is listed as being interested in and that have completed since the last GET_COMPLETED_TRANSACTION request was sent to the particular requesting CPU side transaction agent 512.

The storage side transaction agent 513 then sends 5 the status of each of these transactions back to the requesting CPU side agent 512. The requesting CPU side transaction agent 512, upon reception of this information, then updates its own internal state records (not shown) of the transactions it has issued requests for.

The requesting CPU side transaction agent 512 can then notify 6 the initial requesting control instance that the transaction has completed. For transactions whose list of operations were all PUTs, this completes the transaction from the perspective of the requesting CPU side transaction agent 512 and the original requesting control instance. For transactions that contain GETs, the read information can be appended to the GET_COMPLETED_TRANSACTION request response 5 and then forwarded by the requesting transaction agent 512 to the initial requesting control instance.

In order to handle the possibility of lost GET_COMPLETED_TRANSACTION responses, in various embodiments, the request/response cycles of GET_COMPLETED_TRANSACTION messages have sequence numbers. That is, when a requesting CPU side transaction agent 512 sends a "'next" GET_COMPLETED_TRANSACTION request to a storage side transaction agent 513, the request includes a sequence number that has been incremented from the previous GET_COMPLETED_TRANSACTION request that it sent to the storage side transaction agent 513. If a response is lost, the requesting CPU side transaction agent 512 sends another request with the same (non incremented) sequence number.

The storage end transaction state records 515 do not remove the information for any transaction until all transaction agents that are listed as being interested in the transaction have sent a follow-up GET_COMPLETED_TRANSACTION request to the storage side transaction agent 513 with incremented sequence number as compared to the sequence number that the storage side transaction agent 513 sent a response indicating the transaction was completed. That is, the storage side transaction agent 513 will not remove any transaction information until it can confirm that all interested agents have been informed that the transaction has completed.

In another approach, rather than use sequence numbers, the CPU side transaction agent 512 includes, in a subsequent GET_COMPLETED_TRANSACTION message to the storage side transaction agent, the transaction IDs of previous transactions that it received confirmation of completion of from the storage side transaction agent. If a GET_COMPLETED_TRANSACTION message or response to such a message is lost, the storage side transaction agent will ultimately not receive confirmation from the CPU side transaction agent 512 that it understands a particular transaction has completed. As such the storage side transaction agent will not delete the transaction's information and will wait for the CPU side transaction agent 512 to send a next GET_COMPLETED_TRANSACTION message. The storage side transaction agent will include in its response to the message the transaction ID of the transaction. After the CPU side transaction agent 512 confirms in the following GET_COMPLETED_TRANSACTION message that it received confirmation of the transaction will the storage side transaction agent delist the transaction from the state records (if this particular CPU side transaction agent 512 is the last agent that is interested in the transaction).

The above described approach is believed to be extendable into existing SDS offerings such as Ceph™, Open Stack™ Swift, Lustre™, Hadoop™ Distributed File System (HDFS), Amazon Web Services™ (AWS), Amazon Elastic Block Store™ (EBS), Apache™ or others. The mass storage interfaces 514 may be any storage interfaces such as Bluestore or others. The storage interfaces may physically reach their storage resources 511 over an industry standard peripheral or storage communication technology platform such as Non Volatile Memory Express (NVMe), Peripheral Component Interconnect Express (PCIe), etc.

Figure 6:
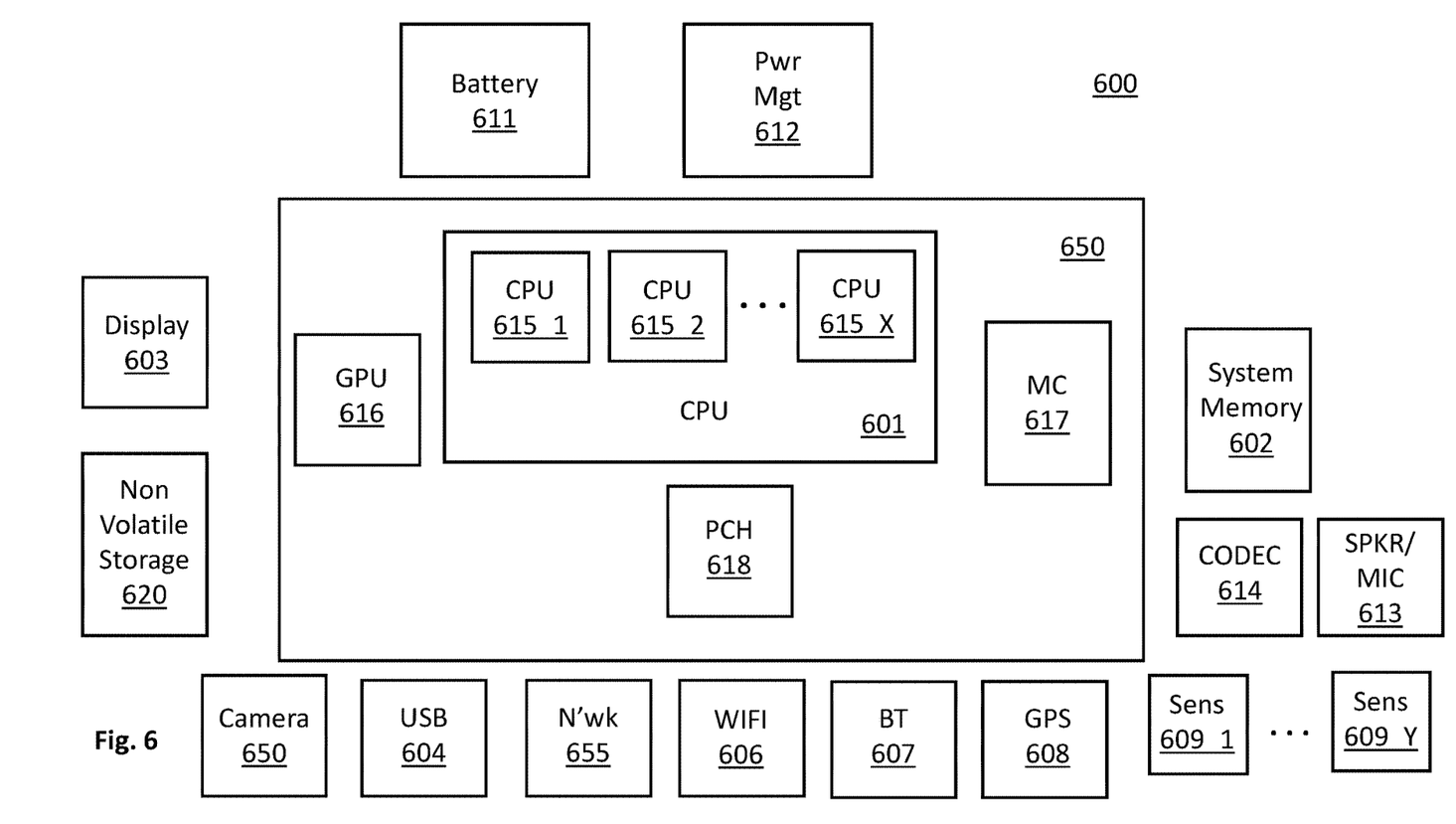
FIG. 6 shows an embodiment of a computing system.

FIG. 6 provides an exemplary depiction of a computing system 600 (e.g., a smartphone, a tablet computer, a laptop computer, a desktop computer, a server computer, etc.). As observed in FIG. 6, the basic computing system 600 may include a central processing unit (CPU) 601 (which may include, e.g., a plurality of general purpose processing cores 615_1 through 615_X) and a main memory controller 617 disposed on a multi-core processor or applications processor, main memory 602 (also referred to as "system memory"), a display 603 (e.g., touchscreen, flat-panel), a local wired point-to-point link (e.g., universal serial bus (USB)) interface 604, a peripheral control hub (PCH) 618; various network I/O functions 605 (such as an Ethernet interface and/or cellular modem subsystem), a wireless local area network (e.g., WiFi) interface 606, a wireless point-to-point link (e.g., Bluetooth) interface 607 and a Global Positioning System interface 608, various sensors 609_1 through 609_Y, one or more cameras 610, a battery 611, a power management control unit 612, a speaker and microphone 613 and an audio coder/decoder 614.

An applications processor or multi-core processor 650 may include one or more general purpose processing cores 615 within its CPU 601, one or more graphical processing units 616, a main memory controller 617 and a peripheral control hub (PCH) 618 (also referred to as I/O controller and the like). The general purpose processing cores 615 typically execute the operating system and application software of the computing system. The graphics processing unit 616 typically executes graphics intensive functions to, e.g., generate graphics information that is presented on the display 603. The main memory controller 617 interfaces with the main memory 602 to write/read data to/from main memory 602. The power management control unit 612 generally controls the power consumption of the system 600. The peripheral control hub 618 manages communications between the computer's processors and memory and the I/O (peripheral) devices.

Each of the touchscreen display 603, the communication interfaces 604-607, the GPS interface 608, the sensors 609, the camera(s) 610, and the speaker/microphone codec 613, 614 all can be viewed as various forms of I/O (input and/or output) relative to the overall computing system including, where appropriate, an integrated peripheral device as well (e.g., the one or more cameras 610). Depending on implementation, various ones of these I/O components may be integrated on the applications processor/multi-core processor 650 or may be located off the die or outside the package of the applications processor/multi-core processor 650. The computing system also includes non-volatile mass storage 620 which may be the mass storage component of the system which may be composed of one or more non-volatile mass storage devices (e.g. hard disk drive, solid state drive, etc.). The non-volatile mass storage 620 may be implemented with any of solid state drives (SSDs), hard disk drive (HDDs), an emerging resistive, three-dimensional non-volatile memory (e.g., Optane™ from Intel, QuantX™ from Micron, etc.).

Note that both a CPU sled and/or storage sled may contain many/most/all of the components of FIG. 6 with the CPU sled having relatively more focus on the CPU 601 and/or CPU cores 615 and the storage sled having relatively more focus on the non volatile mass storage 620. Such CPU and storage sleds can be configured with logic to execute the protocols described above with respect to FIGS. 4 and 5 over an extended network 404, 505 such as an NVMe-of network.

Embodiments of the invention may include various processes as set forth above. The processes may be embodied in program code (e.g., machine-executable instructions). The program code, when processed, causes a general-purpose or special-purpose processor to perform the program code's processes. Alternatively, these processes may be performed by specific/custom hardware components that contain hard interconnected logic circuitry (e.g., application specific integrated circuit (ASIC) logic circuitry) or programmable logic circuitry (e.g., field programmable gate array (FPGA) logic circuitry, programmable logic device (PLD) logic circuitry) for performing the processes, or by any combination of program code and logic circuitry.

Elements of the present invention may also be provided as a machine-readable medium for storing the program code. The machine-readable medium can include, but is not limited to, floppy diskettes, optical disks, CD-ROMs, and magneto-optical disks, FLASH memory, ROMs, RAMs, EPROMs, EEPROMs, magnetic or optical cards or other type of media/machine-readable medium suitable for storing electronic instructions.

A method has been described above. The method includes performing the following with a storage end transaction agent within a storage sled of a rack mounted computing system: receiving a request to perform storage operations with one or more storage devices of the storage sled; recognizing that the storage operations have successfully completed; and, after the storage operations have successfully completed, reporting to a CPU side transaction agent that sent the request that the storage operations have successfully completed.

In various embodiments the request includes a transaction request. In various embodiments the request identifies other CPU side instances that are interested in a transaction that includes the storage operations corresponding. In various embodiments, the storage end transaction agent enters a record in state information that includes a transaction identifier of a transaction that includes the storage operations and identifies other CPU side instances that are interested in the transaction.

In various embodiments the reporting is responsive to the CPU side transaction agent having requested a status of pending transactions being overseen by the storage end transaction agent. In various embodiments the method is performed by program code integrated into respective program code of any of: Ceph; Open Stack Swift; Lustre; HDFS; Amazon AWS EBS; and, Apache. In various embodiments, if the CPU side transaction agent does not receive a report that the storage operations have successfully completed, the storage end transaction agent re-reports to the CPU side transaction agent that the storage operations have successfully completed.

A machine readable storage medium containing program code that when processed by one or more processors causes the method to be performed has also been described.

A computing system has been described. The computing system includes: a CPU sled; a network, the CPU sled coupled to the network; a storage sled, the storage sled coupled to the network, the storage sled comprising a machine readable storage medium containing program code that when processed by one or more processors causes the method to be performed.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method, comprising:
    performing the following with a storage end transaction agent within a storage sled of a rack mounted computing system:
    receiving a request to perform storage operations with one or more storage devices of the storage sled, the request specifying an all-or-nothing semantic for the storage operations, wherein the request identifies other CPU side instances that are interested in a transaction that includes the storage operations;
    recognizing that all of the storage operations have successfully completed; and,
    after all of the storage operations have successfully completed, reporting to a CPU side transaction agent that sent the request that all of the storage operations have successfully completed.

2. The method of claim 1 wherein the request includes a transaction request.

3. The method of claim 1 wherein the storage end transaction agent enters a record in state information that includes a transaction identifier of a transaction that includes the storage operations and identifies other CPU side instances that are interested in the transaction, the other CPU side instances to also be informed that respective storage operations of the transaction have successfully completed.

4. The method of claim 1 wherein the reporting is responsive to the CPU side transaction agent
    having requested a status of pending transactions being overseen by the storage end transaction agent.

5. The method of claim 1 wherein the method is performed by program code integrated into respective program code of any of:
    Ceph;
    Open Stack Swift;
    Lustre;
    Hadoop Distributed File System (HDFS);
    Amazon Web Services (AWS);
    Amazon Elastic Block Store (EBS); and,
    Apache.

6. The method of claim 1 wherein if the CPU side transaction agent does not receive a report that all of the storage operations have successfully completed, the storage end transaction agent re-reports to the CPU side transaction agent that all of the storage operations have successfully completed.

7. A machine readable storage medium containing program code that when processed by one or more processors causes a method to be performed, the method comprising:
    performing the following with a storage end transaction agent within a storage sled of a rack mounted computing system:
    receiving a request to perform storage operations with one or more storage devices of the storage sled, the request specifying an all-or-nothing semantic for the storage operations, wherein the request identifies other CPU side instances that are interested in a transaction that includes the storage operations;
    recognizing that all of the storage operations have successfully completed; and,
    after all of the storage operations have successfully completed, reporting to a CPU side transaction agent that sent the request that all of the storage operations have successfully completed.

8. The method of claim 7 wherein the request includes a transaction request.

9. The method of claim 7 wherein the storage end transaction agent enters a record in state information that includes a transaction identifier of a transaction that includes the storage operations and identifies other CPU side instances that are interested in the transaction, the other CPU side instances to also be informed that respective storage operations of the transaction have successfully completed.

10. The method of claim 7 wherein the reporting is responsive to the CPU side transaction agent having requested a status of pending transactions being overseen by the storage end transaction agent.

11. The method of claim 7 wherein the method is performed by program code integrated into respective program code of any of:
Ceph;
Open Stack Swift;
Lustre;
Hadoop Distributed File System (HDFS);
Amazon Web Services (AWS);
Amazon Elastic Block Store (EBS); and,
Apache.

12. The method of claim 7 wherein if the CPU side transaction agent does not receive a report that all of the storage operations have successfully completed, the storage end transaction agent re-reports to the CPU side transaction agent that all of the storage operations have successfully completed.

13. A computing system, comprising:
a CPU sled;
a network, the CPU sled coupled to the network;
a storage sled, the storage sled coupled to the network, the storage sled comprising a machine readable storage medium containing program code that when processed by one or more processors causes a method to be performed, the method comprising:
performing the following with a storage end transaction agent within the storage sled of a rack mounted computing system:

receiving a request to perform storage operations with one or more storage devices of the storage sled, the request specifying an all-or-nothing semantic for the storage operations, wherein the request identifies other CPU side instances that are interested in a transaction that includes the storage operations;
recognizing that all of the storage operations have successfully completed; and,
after all of the storage operations have successfully completed, reporting to a CPU side transaction agent that sent the request that all of the storage operations have successfully completed.

14. The computing system of claim 13 wherein the request includes a transaction request.

15. The computing system of claim 13 wherein the storage end transaction agent enters a record in state information that includes a transaction identifier of a transaction that includes the storage operations and identifies other CPU side instances that are interested in the transaction.

16. The computing system of claim 13 wherein the reporting is responsive to the CPU side transaction agent having requested a status of pending transactions being overseen by the storage end transaction agent.

17. The computing system of claim 13 wherein the method is performed by program code integrated into respective program code of any of:
Ceph;
Open Stack Swift;
Lustre;
Hadoop Distributed File System (HDFS);
Amazon Web Services (AWS);
Amazon Elastic Block Store (EBS); and,
Apache.

* * * * *